United States Patent [19]

Knippschild et al.

[11] 3,985,862

[45] Oct. 12, 1976

[54] PROCESS FOR THE PRODUCTION OF SODIUM PERBORATE

[75] Inventors: Gerd Knippschild, Rheinfelden-Beuggen; Hubert Schuster, Rheinfelden-Karsau, both of Germany

[73] Assignee: Deutsche Gold- und Silber-Scheideanstalt vormals Roessler, Germany

[22] Filed: June 6, 1975

[21] Appl. No.: 584,530

Related U.S. Application Data

[63] Continuation-in-part of Ser. No. 391,997, Aug. 27, 1973, abandoned, and a continuation-in-part of Ser. No. 391,998, Aug. 27, 1973, abandoned.

[30] Foreign Application Priority Data

Sept. 2, 1972 Germany............................ 2243341
Sept. 2, 1972 Germany............................ 2243342

[52] U.S. Cl.................................. 423/281; 23/301; 23/302 T
[51] Int. Cl.²......................................... C01B 15/12
[58] Field of Search ............... 423/281; 23/301, 302

[56] References Cited
UNITED STATES PATENTS

| | | | |
|---|---|---|---|
| 3,574,564 | 4/1971 | Olivier et al............................ | 23/301 |
| 3,598,524 | 8/1971 | Reilly.................................... | 423/281 |
| 3,661,510 | 5/1972 | Winkley................................ | 423/281 |
| 3,726,959 | 4/1973 | Honig et al........................... | 423/281 |

FOREIGN PATENTS OR APPLICATIONS

| | | |
|---|---|---|
| 1,187,352 | 3/1959 | France |
| 1,142,304 | 2/1969 | United Kingdom |

*Primary Examiner*—G. O. Peters
*Attorney, Agent, or Firm*—Cushman, Darby & Cushman

[57] ABSTRACT

Abrasion resistant and coarser sodium perborate tetrahydrate is prepared by reacting an aqueous sodium metaborate solution with aqueous hydrogen peroxide while avoiding free active oxygen and free alkali in the reaction medium. A strongly supersaturated perborate tetrahydrate solution having 200 to 700 grams/liter of perborate tetrahydrate is introduced into a previously prepared suspension of mother liquor and innoculant crystals which contains 100 to 500 grams/liter of suspension of seed crystals at such a rate that not more than 30 grams of perborate tetrahydrate grow as crystals per minute per square meter apparent innoculant surface area at 20 to 40° C. and a rate of crystallization growth of not more than 100% whereupon the temperature is reduced to 15° C. within 15 to 30 minutes, in a given case in a subsequent step. In another aspect of the invention the perborate is added at a point not earlier than the crystallizer.

17 Claims, No Drawings

PROCESS FOR THE PRODUCTION OF SODIUM PERBORATE

This application is a continuation-in-part of application Ser. No. 391,997 filed Aug. 27, 1973 and now abandoned and application Ser. No. 391,998, filed Aug. 27, 1973 and now abandoned. There is nothing in the present application not found in the two parent applications and the present application includes the entire disclosures of the two parent applications.

While on the one hand the reaction of sodium metaborate and per compounds such as hydrogen peroxide in alkaline medium to form sodium perborate has been known for a long time those skilled in the art likewise known that the individual methods for carrying out this reaction have an important influence on the formation of specific properties in the perborate particles.

As factors which have considerable influence on the special type of particles or on the spectrum of particles there can be named the crystallization temperature as well as the proportions of boron to alkali and active oxygen, which can be stoichiometric or nonstoichiometric. There are partially contradictory views in this regard as, for example, in the crystalization temperature. According to Golden U.S. Pat. No. 2,863,835 column 3, lines 20–40 there cannot be used temperatures above 11° C. if the formation of fine crystals is to be avoided. Conversely thereto, Reilley German Auslegescrift No. 1,948,601 prefers temperatures of 20° to 40° C., column 6, line 34 as does the corresponding Reilly U.S. Pat. No. 3,598,524, and according to Mollard German Auslegeschrift No. 1,567,803, a temperature of 20° C. is preferred, column 6, lines 17–19. Nevertheless, there are obtained industrially interesting particle spectrums and not too fine particles.

In the process of Reilly German Ausiegeschrift No. 1,948,601 and the Reilly U.S. patent there is shown the influence of the above mentioned molar proportions, especially of boron to active oxygen on the structure of the resulting perborate particles. To the same effect is the process of Pellens Austrian Pat. No. 246,698.

By avoiding free hydrogen peroxide in the above named production, i.e., working with an excess of metaborate, according to Reilly German Ausiegeschrift No. 1,948,601 and Reilly U.S. Pat. No. 3,598,524 an abrasion resistant sodium perborate is obtained in the form of relatively thin plates, in the presence of an excess of hydrogen peroxide, accordingly with free hydrogen peroxide, on the other hand highly porous small balls are obtained according to Pellens Austrian Pat. No. 246,698.

Furthermore, it is possible to agglutinate very fine needle shaped crystals into balls and to surround them with an outer layer of perborate and to make them hard and compact in this way and thereby simultaneously bring their apparent density within the desired boundaries for washing agents, if finely suspended crystal seeds in a supersaturated sodium perborate solution are brought into contact with stirring with predetermined concentrated hydrogen peroxide and metaborate solution according to the process of the aforementioned Reilly German Auslegeschrift and Reilly U.S. Patent. In this connection also see Mollard German Pat. No. 1,178,828.

The concentration of the added solutions of hydrogen peroxide and boron compound itself also have an effect on the size and therewith the apparent density (bulk density) of the crystals as does the residence time in the supersaturated solution, see Smith British Pat. No. 911,664.

Besides the structure of the particles it is understood that the more or less simple steps of carrying out of the reaction itself is of significance, and in this regard the crystallization in one or more steps can play a substantial role, for example, for drying of the crystals, see Reilly German Auslegeschrift No. 1,948,601 or Reilly U.S. Pat. No. 3,598,524.

From what has been said it follows that it cannot be predicted from apparently slight changes in carrying out the reaction how these changes affect the granule structure, the granule spectrum and the apparent density or the behavior of the crystals recovered within fixed steps such as filtration or drying.

The object of the invention is the crystallization of an abrasion resistant and coarser granule of sodium perborate tetrahydrate without forming noteworthy amounts of fine particles.

It has now been found that this object can be attained by reacting an aqueous sodium metaborate solution with aqueous hydrogen peroxide while avoiding free active oxygen and free alkali in the reaction medium if a strongly supersaturated solution of sodium perborate tetrahydrate containing 200 to 700 grams of the sodium perborate tetrahydrate per liter of solution is introduced into a previously formed suspension of mother liquor and seed crystals which contains 100 to 500 grams of seed crystals per liter of suspension at such a speed that not more than 30 grams of sodium perborate tetrahydrate per square meter of apparent innoculant surface grow as crystals per minute at 20° to 40° C. and a crystallization growth rate of not more than 100% whereupon the temperature is lowered to 15° C. inside of 15 to 30 minutes, in a given case in a subsequent step.

Preferably there is added a supersaturated solution of sodium perborate tetrahydrate having 300 to 500 grams of the perborate tetrahydrate per liter of solution. The concentrations of the metaborate added and hydrogen peroxide solution are not critical. There can be used for example sodium metaborate solutions having a concentration of 100 to 400 grams per liter and hydrogen peroxide solutions having a concentration of 25 to 70 % by weight. Generally, there are added customary commercial solutions. It is critical that the specified concentrations of supersaturated perborate tetrahydrate solution of the invention be attained. There is preferably used as the suspension a suspension with 250 to 450 grams of sodium perborate tetrahydrate per liter of suspension.

The supersaturated perforate tetrahydrate solution is introduced into the crystallizer at such a speed that per square meter apparent innoculant surface not more than 30 grams of perborate tetrahydrate grow as crystals during one minute. A very good abrasion resistant coarser particle is obtained if per minute there is a crystallization growth of 10–20 grams of sodium perborate tetrahydrate per square meter innoculant apparent surface area and a coarser especially abrasion resistant particle by crystallization growth of 1–10 grams of perborate tetrahydrate per minute.

For the definition of "apparent innoculant surface" the starting point is that the individual perborate tetrahydrate crystals are spheres.

In actuality they are more or less sprouting. The stated surface areas per sieve fraction is therefore idealized and is obtained by formation of the arithmetical average of the bound sieve fraction. However, if the surface area is combined with the speed of feeding there is obtained for the crystallization of the invention a quantity which states, how many grams of sodium perborate tetrahydrate crystallize per square meter of innoculant apparent surface area inside one minute. Since in any event there should be avoided a spontaneous formation of innoculant the crystallization of the invention is designated as "crystallization growth" because preferably the innoculant crystals present grow further.

As the rate of crystallization growth there is designated the ratio of:

$$\frac{\text{Grams of perborate fed}}{\text{Grams of perborate present}} \times 100\%$$

This rate of crystallization growth should not exceed 25% per crystallization growth process, i.e., per single bringing the suspension present in contact with the supplied supersaturated solution. The crystallization growth itself occurs preferably at temperatures of 25°–35° C. The rate of crystallization growth is usually at least 20 %.

After the end of the crystal growth which occurs in discontinuous processes by ending the feeding of supersaturated perborate tetrahydrate solution and in continuous processes by leading the suspension out of the crystallizer, the temperature of the suspension is lowered from 20° to 40° C. in one or more subsequent cooling steps inside of 15 to 30 minutes to 15° C. Afterwards it is filtered and dried in known manner.

The industrial advantages of the process of the invention include the recovery of an abrasion resistant, low in dust and coarser sodium perborate tetrahydrate, namely only by control of the individual process steps without addition of foreign materials.

In Mollar German Offenlegunsschrift No. 2,201,581 on the contrary the influence of the crystal habit is attained only by addition of anionic surface active agents, which, moreover, must be again removed in the recovery of the mother liquor by absorbing resins of the polystyrene type having large macromolecular porosity or activated carbon. Besides the presence of a foreign product there is also necessary additional plant both for the purification of the mother liquor and for the reactivation of the exchange resin.

Unless otherwise indicated, all parts and percentages are by weight.

The invention will be explained in more detail in the following examples wherein the abrasion was determined in the following manner.

To screen out the fractions 0.2–0.315 mm, 0.315–0.4 mm., 0.4–0.5 mm., and 0.5 to 0.63 mm. there were weighed out about 350 grams of sodium perborate and this was sieved for 5 minutes on a sieving machine. The individual, isolated fractions were sieved once more for 5 minutes in a sieve set with the stated sieve meshes. Subsequently there were weighed out exactly 50 grams of the perborate and this was placed on the individual, cleansed sieves each having an intermediate bottom and there were added two small rubber cubes having a cant length of about 10 mm. The total weight is to amount to 5 grams. The sieves were then placed in a Jel sieve machine and the fractions of perborate after 5 minutes running time were determined. The evaluation was made through graphically plotting the ascertained percentage of abraded parts of the 4 fractions which led to surface numbers which added together give the abrasion number:

| | |
|---|---|
| Fraction 0.2–0.315 mm | = Abrasion % × 2×4.6 (surface factor) |
| Fraction 0.315–0.4 mm | = Abrasion % × 2×3.4 |
| Fraction 0.4 – 0.5 mm | = Abrasion % × 2×4.0 |
| Fraction 0.5 – 0.63 mm | = Abrasion % × 2×5.2 |
| Total fraction | = Σ abrasion (cm$^2$) |

The abrasion test can also be carried out with 100 grams. In that case in the above formulae the multiplication factor 2 is dropped and instead of 2 rubber cubes there are added 4 rubber cubes.

In example 1 the stability of supersaturated sodium perborate tetrahydrate solutions is pointed out; in example 2 there is shown the recovery of a very abrasion resistant tetrahydrate under optimum crystallization growth conditions and in comparison thereto in example 3.4 and 5 there is shown the increase in abrasion using a higher speed of feeding (example 3), a higher temperature of crystallization growth (example 4) and a higher rate of crystallization (example 5).

In example 6 under optimum conditions a definite fraction was made abrasion resistant in several crystallization growth processes (also see cuts 1–6). In contrast to example 6, examples 7 and 8 show that preferably an increase in coarseness occurs if one simultaneously applies a rate of crystal growth above 25%, a higher crystallization temperature than 25° C. and a proportionately lower concentration of suspension.

EXAMPLE 1

General Stability Example

This example shows the stability of supersaturated sodium perborate tetrahydrate is dependent upon the concentration of perborate tetrahydrate and temperature. In each case 100 ml of an exactly standardized sodium metaborate solution was reacted in a thermostatically controlled glass vessel with the corresponding amount of hydrogen peroxide (about 90% of the stoichiometry based on the amount of free metaborate). The spontaneous reaction led to an increase in temperature in the mixture which very quickly took the temperature given in advance of the thermostat.

The time during which the mixture was held at the storage temperature up to crystallization was stopped.

TABLE 1

| Starting Amounts, Concentration Meta Borate Sol. H$_2$O Sol. | | | | Theor. Perbor. Conc. g/l | Meta Bor. Sol. °C. | Mixing Temp. Meta Bor + H$_2$O$_2$ °C | Storage Temp. °C | Time to Crystallization Min. |
|---|---|---|---|---|---|---|---|---|
| ml | Conc. in mol NaBO$_2$/l | ml | Conc. in mol H$_2$O$_2$/l | | | | | |
| 100 | 6.5 | 64.1 | 9.1 | 675 | 41.2 | 53.5 | 35 | at 38.5° C. crystallization |
| 100 | 6.5 | 64.1 | 9.1 | 675 | 41.0 | 53.2 | 40 | at 41.3° C. crystallization |
| 100 | 6.5 | 64.1 | 9.1 | 675 | 40.2 | 52.0 | 45 | after 2 minutes |
| 100 | 6.5 | 64.1 | 9.1 | 675 | 40.5 | 52.0 | 50 | after 10 minutes |

TABLE 1-continued

| | Starting Amounts, Concentration Meta Borate Sol. H₂O Sol. | | | Theor. Perbor. Conc. g/l | Temperature | | Storage Temp. °C | Time to Crystallization Min. |
|---|---|---|---|---|---|---|---|---|
| ml | Conc. in mol NaBO₂/l | ml | Conc. in mol H₂O₂/l | | Meta Bor. Sol. °C. | Mixing Temp. Meta Bor + H₂O₂ °C | | |
| 100 | 6.5 | 64.1 | 9.1 | 675 | 40.5 | 51.4 | 55 | after 60 minutes |
| 100 | 3.0 | 28.8 | 9.1 | 352 | 34.0 | 40.0 | 35 | at 35° C. crystallization |
| 100 | 3.0 | 28.8 | 9.1 | 352 | 36.0 | 41.5 | 40 | after 2 minutes |
| 100 | 3.0 | 28.8 | 9.1 | 352 | 37.6 | 42.6 | 45 | after 10 minutes |
| 100 | 3.0 | 28.8 | 9.1 | 352 | 38.7 | 43.5 | 50 | after 25 minutes |
| 100 | 3.0 | 28.8 | 9.1 | 352 | 37.5 | 42.8 | 55 | after 95 minutes |
| 100 | 3.0 | 28.8 | 9.1 | 352 | 36.2 | 41.6 | 60 | after 105 minutes |

EXAMPLE 2

Optimum Crystallization Growth Conditions 300 grams of innoculant salt were present in 500 ml of mother liquor having a temperature of 15° C., i.e. a salt magma concentration of 447 grams sodium perborate tetrahydrate/l of salt magma. There was fed in a premixed mixture of 200 ml of sodium metaborate solution having 2.69 moles of NaBO₂/l and 46.7 ml of hydrogen peroxide solution containing 10.48 moles of H₂O₂ as a supersaturated perborate solution having a temperature of about 48° C. and 330 grams of perborate/liter.

Rate of crystallization growth — 25%
Temperature of crystallization growth — 23° C
Speed of feeding — 13.6 grams perborate/min.
Order of crystallization growth — 4.6 grams perborate/m²/min.
Surface area of the innoculant — 2.982 m²

| Sieve analysis (mm): | 0.63 | 0.5 | 0.4 | 0.315 | 0.2 | 0.1 | Residue |
|---|---|---|---|---|---|---|---|
| Starting material in weight % | 3 | 14 | 33 | 16 | 33 | 1 | 0 |
| Material tested in weight % | 5 | 19 | 36 | 13 | 24 | 0 | 3 |

Abrasion
  Starting material — 130.9 cm²
  Material tested — 96.4 cm²

EXAMPLE 3

Higher Speed of Feeding

The process was the same as in example 2 except there was used a higher speed of feeding.

Speed of feeding: 85 grams perborate/min
Order of crystallization growth: 28.5 grams perborate/m²/min

| Sieve analysis (mm): | 0.63 | 0.5 | 0.4 | 0.315 | 0.2 | 0.1 | R |
|---|---|---|---|---|---|---|---|
| Starting material in weight % | 3 | 14 | 33 | 16 | 33 | 1 | 0 |
| Material tested in weight % | 4 | 16 | 33 | 13 | 30 | 0 | 4 |

Abrasion
  Starting material — 130.9 cm²
  Material tested — 127.6 cm²

EXAMPLE 4

Higher Temperature of Crystallization Growth

The process was the same as in example 2 except there was used a temperature of crystallization growth of 40° C.

| Sieve analysis (mm): | 0.63 | 0.5 | 0.4 | 0.315 | 0.2 | 0.4 | R |
|---|---|---|---|---|---|---|---|
| Starting material in weight % | 2 | 16 | 29 | 19 | 32 | 2 | 1 |
| Material tested in weight % | 6 | 23 | 37 | 14 | 20 | 0 | 0 |

Abrasion
  Starting material — 130.9 cm²
  Material tested — 124.0 cm²

EXAMPLE 5

Higher Rate of Crystallization Growth

The process was the same as in example 2 except that there was used a rate of crystallization growth of 100%.

| Sieve analysis (mm): | 0.63 | 0.5 | 0.4 | 0.315 | 0.2 | 0.1 | R |
|---|---|---|---|---|---|---|---|
| Starting material in weight % | 3 | 14 | 33 | 16 | 33 | 1 | 0 |

-continued

| Sieve analysis (mm): | 0.63 | 0.5 | 0.4 | 0.315 | 0.2 | 0.1 | R |
|---|---|---|---|---|---|---|---|
| Material tested in weight % | 4 | 16 | 30 | 13 | 19 | 1 | 17 |

Abrasion
  Starting material — 130.9 cm$^2$
  Material tested — 119.3 cm$^2$

EXAMPLE 6

Crystallization Growth of a Germinating Perborate Under Optimum Conditions

Under optimum conditions of crystallization growth in a manner analogous to example 2 there were used with new perborate highly germinating crystals of the isolated fractions 0.2 – 0.315 cm in six successive crystallization growth processes, i.e. with a rate of crystallization growth of all together 150% between the germinations. After each crystallization process, the salt was isolated, air dried, the portion <0.2 mm sieved off and the proportion >0.2 again applied.

Cut 1
  Starting Material Fraction 0.2 – 0.315 mm
  Slanted light increase in coarseness 1 : 32
Cut 2
  Starting Material Fraction 0.2 – 0.315 mm
  Transmitted light, increase in coarseness 1 : 32
Cut 3
  Material Tested Fraction >0.315 mm
  Slanted light increase in coarseness 1 : 32
Cut 4
  Material Tested Fraction >0.315 mm
  Transmitted light increase in coarseness 1 : 32
Cut 5
  Material Tested Fraction >0.315 mm
  Slanted light increase in coarseness 1 : 50
Cut 6
  Material Tested Fraction >0.315 mm
  Transmitted light increase in coarseness 1 : 50

EXAMPLE 7

This example is concerned only with the increase in coarseness of a preformed granules by providing a smaller salt concentration, a higher rate of crystallization growth and a high temperature of crystallization growth.

300 grams of the fraction 0.2 – 0.315 mm were present in 1000 ml of mother liquid at 25° C. There was fed a strongly supersaturated perborate solution containing 334 grams/liter having a temperature of about 48° C., obtained from 400 ml of metaborate solution containing 396 grams of free $NaBO_2/l$ and 83 ml of $H_2O_2$ containing 399 grams of $H_2O_2/l$.

Rate of crystallization growth: 50%
Temperature of crystallization growth: 33° C
Speed of Feeding: 15 grams perborate/min.
Surface area of the innoculant: 4.158 m$^2$
Order of crystallization growth: 3.6 grams perborate/m$^2$/min.

Four crystallization growth processes were carried out, i.e. the rate of crystallization growth in all amounted to 200%. After each operation the salt was isolated, air dried, the fraction <0.2 mm. sieved off and the fraction >0.2 mm. again used.

| Sieve analysis (mm): | 0.63 | 0.5 | 0.4 | 0.315 | 0.2 | R |
|---|---|---|---|---|---|---|
| | 0 | 0 | 57 | 31 | 5 | 7 |

Cut 7
  Starting Material Fraction 0.2 – 0.315 mm
  Slanted light increase in coarseness 1 : 32
Cut 8
  Starting Material Fraction 0.2 – 0.315 mm
  Transmitted light increase in coarseness 1 : 32
Cut 9
  Material Tested Fraction >0.315 mm
  Slanted light increase in coarseness 1 : 32
Cut 10
  Material Tested Fraction >0.315 mm
  Transmitted light increase in coarseness 1 : 32

EXAMPLE 8

This example was analogous to example 7. Instead of strongly germinating particles, single crystals were made coarser.
Rate of crystallization growth: 50%
Temperature of crystallization growth: 33° C
Speed of feeding: 15 grams perborate/min.

After three crystallization growth processes, each with a rate of crystallization growth of 50%, there were obtained the following salts:

| Sieve analysis (mm) | 0.63 | 0.5 | 0.4 | 0.315 | 0.2 | R |
|---|---|---|---|---|---|---|
| | 0 | 0 | 15 | 35 | 34 | 16 |

Cut 11
  Starting Material Fraction 0.2 – 0.315 mm
  Slanted light increase in coarseness 1 : 32
Cut 12
  Starting Material Fraction 0.2 – 0.315 mm
  Transmitted light increase in coarseness 1 : 32
Cut 13
  Material Tested Fraction >0.315 mm
  Slanted light increase in coarseness 1 : 32
Cut 14
  Material Tested Fraction >0.315 mm
  Transmitted light increase in coarseness 1 : 32

In another aspect of the invention there has been developed a process wherein abrasion resistant, coarse granular sodium perborate tetrahydrate is prepared by reacting sodium metaborate and hydrogen peroxide in an aqueous suspension of seeds of sodium perborate tetrahydrate in a saturated solution of the perborate while also adding to the salt suspension into the crystallizer or leaving the crystallizer a clear sodium perborate supersaturated solution at 40° to 50° C, the supersaturated solution containing 200 to 700 grams of sodium perborate tetrahydrate per liter. The rest of the process is carried out in conventional manner (the language "clear, supersaturated" solution means that the solution is free of suspended or precipitated particles of salt, i.e., no solid is present.)

The feeding of the clear supersaturated solution takes place in an amount of 5 to 50%, preferably 10 to 30% of the weight of the sodium perborate tetrahydrate which is contained in the perborate salt suspension leaving the crystallizer. The feeding can take place either before, at or in the coolers for the salt suspension. If several coolers are used the feeding of the clear supersaturated solution of perborate can also be distributed between them in such fashion that per subdivision a maximum of 50% of the supersaturated clear solution of perborate is added.

As stated above, especially suited are concentrations of 300 to 500 grams of sodium perborate tetrahydrate per liter of supersaturated solution.

Also, as stated above, the concentrations of the sodium metaborate and aqueous hydrogen peroxide solution added are not critical. There can be used for example sodium metaborate solutions having a concentration of 100 to 400 grams per liter and hydrogen peroxide solutions having a concentration of 25 to 70% by weight. Generally, there are added customary commercial solutions. However, as pointed out above, it is critical that the specified concentrations of supersaturated perborate tetrahydrate solutions of the invention be maintained. The production of the clear solution at 40° to 50° C. can take place previously in either a kettle or tube, whereby the immediate mixing and formation of a supersaturated solution of perborate tetrahydrate occurs.

The process itself, i.e., the crystallization in the crystallizer and cooler, the filtration, the drying of the granules and the return of the perborate tetrahydrate saturated mother liquor into the crystallizer, as stated, can be carried out in a known manner, i.e., for example the crystallization begins at temperatures of 20° to 40° C. in the crystallizer and is completed by cooling the magma formed to preferably 15° C. in one or more subsequent coolers, whereupon after filtration in rotary filters the production obtained is dried. The resulting saturated mother liquor is again added for the production of sodium perborate solution. After adding the supersaturated solution to the salt suspension it is also possible to return this mixture into the crystallizer.

It is especially effective according to the invention if in the subsequent feeding of the clear, supersaturated solution to the salt suspension containing 100 – 500 grams of innoculant per liter of suspension leaving the crystallizer the following conditions are observed.

The supersaturated perborate tetrahydrate solution should be introduced at such a speed that not more than 30 grams of perborate tetrahydrate grows as crystals during per minute per square meter innoculant apparent surface area at 20° to 40° C. and a rate of crystallization growth of not more than 100%. The rate of crystallization growth is usually at least 20%.

EXAMPLE 9

An aqueous suspension having a concentration of 447 grams of sodium perborate tetrahydrate per liter and a temperature of 15° C. and a supersaturated sodium perborate tetrahydrate solution having a concentration of 330 grams of sodium perborate tetrahydrate per liter and a temperature of 48° C. were jointly led behind the crystallizer at such a speed that there was a crystallization growth of 4.6 grams of sodium perborate tetrahydrate per square meter of innoculant apparent surface area per minute. The temperature of crystallization growth was 23° C., the rate of crystallization growth was 25%.

| Sieve Analysis (mm.) | 0.63 | 0.5 | 0.4 | 0.315 | 0.2 | 0.1 | R |
|---|---|---|---|---|---|---|---|
| Starting Material In Weight % | 3 | 14 | 33 | 16 | 33 | 1 | 0 |
| Material Tested In Weight % | 5 | 19 | 36 | 13 | 24 | 0 | 3 |
| R = residue | | | | | | | |
| Abrasion: | | | | | | | |
| Starting Material | | | 130.9 cm² | | | | |
| Material Tested | | | 96.4 cm² | | | | |

In this aspect of the invention the supersaturated solution should preferably be added to the salt suspension leaving the crystallizer.

What is claimed is:

1. A process for the production of abrasion resistant, coarse sodium perborate tetrahydrate by reacting aqueous sodium metaborate solution with aqueous hydrogen peroxide in the absence of free active oxygen and free alkali in the reaction medium and additionally comprising introducing a strongly supersaturated solution of sodium perborate tetrahydrate having a concentration of 200 to 700 grams per liter of said perborate tetrahydrate into a previously prepared suspension of aqueous sodium perborate mother liquor and sodium perborate tetrahydrate innoculant crystals which contains 100 to 500 grams per liter of suspension of said crystals, the rate of introduction being such that not more than 30 grams of said perborate tetrahydrate grow as crystals per minute per sq. meter of apparent innoculant surface area at 20° to 40° C. and a rate of crystallization growth of not more than 100%.

2. A process according to claim 1 including the step of reducing the temperature to 15° C. within 15 to 30 minutes after the crystallization growth is completed.

3. A process according to claim 1 wherein the supersaturated solution contains 300 to 500 grams of sodium perborate tetrahydrate per liter.

4. A process according to claim 3 wherein the rate of crystallization growth is not over 25%.

5. A process according to claim 4 wherein there is a crystallization growth of 10–20 grams of sodium perborate tetrahydrate per square meter of innoculant apparent surface area per minute.

6. A process according to claim 4 wherein there is a crystallization growth of 1–10 grams of sodium perborate tetrahydrate per square meter of innoculant apparent surface area per minute.

7. A process according to claim 4 wherein there is a crystallization growth of 1–20 grams of sodium perborate tetrahydrate per square meter of innoculant apparent surface area per minute and the previously prepared suspension has 250 to 450 grams of sodium perborate tetrahydrate per liter of suspension.

8. A process according to claim 7 wherein the temperature of crystallization growth is 25° to 35° C.

9. A process for the production of abrasion resistant coarse sodium perborate tetrahydrate by reacting sodium metaborate and hydrogen peroxide in an aqueous suspension of seeds of sodium perborate tetrahydrate in a saturated solution of the perborate and wherein the sodium perborate tetrahydrate crystallizes in a crystallizer and additionally comprising adding to the perborate suspension after said suspension leaves the crystallizer a clear sodium perborate tetrahydrate supersaturated aqueous solution containing 200 to 700 grams of sodium perborate tetrahydrate per liter at 40° to 50° C., said clear solution having been prepared by reacting sodium metaborate and hydrogen peroxide in water.

10. A process according to claim 9 additionally employing a cooler wherein the clear supersaturated perborate solution is added after leaving the crystallizer but before leaving the cooler.

11. A process according to claim 10, wherein the clear, supersaturated perborate solution is added to the sodium perborate tetrahydrate suspension at such a speed that per minute the crystallization growth is no more than 30 grams of sodium perborate tetrahydrate per square meter of innoculant apparent surface area, the temperature is 20° to 40° C. during said growth after the crystallizer and the rate of crystallization growth is not over 100%.

12. A process according to claim 9 wherein the clear supersaturated perborate solution contains 300 to 500 grams of sodium perborate tetrahydrate per liter.

13. A process according to claim 12 wherein there is added to the perborate suspension 5 to 50% of the clear supersaturated perborate solution based on the amount of the sodium perborate tetrahydrate which is contained in the perborate suspension leaving the crystallizer.

14. A process according to claim 13 wherein the amount of clear supersaturated perborate solution is 10 to 30% based on the perborate tetrahydrate contained in the salt suspension leaving the crystallizer.

15. A process according to claim 14 wherein the clear perborate solution is added to the salt suspension before the cooler.

16. A process according to claim 14 wherein the clear perborate solution is added to the salt suspension in the coolers.

17. A process according to claim 14 wherein the clear, supersaturated perborate solution is added to the salt suspension at such a speed that per minute the crystallization growth is no more than 30 grams of sodium perborate tetrahydrate per square meter of innoculant apparent surface area, the temperature is 20° to 40° C. and the rate of crystallization growth is not over 100%.

* * * * *